United States Patent [19]
Elliott

[11] Patent Number: 6,151,569
[45] Date of Patent: *Nov. 21, 2000

[54] AUTOMATED SEQUENCE OF MACHINE-PERFORMED ATTEMPTS TO UNFREEZE AN APPARENTLY FROZEN APPLICATION PROGRAM

[75] Inventor: Scott Elliott, Beaverton, Oreg.

[73] Assignee: Symantec Corporation, Cupertino, Calif.

[ * ] Notice: This patent is subject to a terminal disclaimer.

[21] Appl. No.: 09/275,171

[22] Filed: Mar. 24, 1999

Related U.S. Application Data

[63] Continuation of application No. 08/937,629, Sep. 26, 1997, Pat. No. 5,911,060.

[51] Int. Cl.[7] .................................................. G06F 9/45
[52] U.S. Cl. ......................... 703/22; 707/200; 709/100; 717/4
[58] Field of Search ............................... 703/22; 707/200, 707/202; 709/100; 717/4, 6; 714/16, 34, 38, 47; 345/344; 712/244

[56] References Cited

U.S. PATENT DOCUMENTS

| | | |
|---|---|---|
| 5,410,685 | 4/1995 | Banda et al. .............................. 714/38 |
| 5,515,493 | 5/1996 | Boston et al. ........................... 345/344 |
| 5,526,485 | 6/1996 | Brodsky ..................................... 714/38 |
| 5,712,971 | 1/1998 | Stanfill et al. ............................. 714/34 |
| 5,748,882 | 5/1998 | Huang ....................................... 714/47 |
| 5,815,702 | 9/1998 | Kannan et al. ......................... 712/244 |
| 5,819,022 | 10/1998 | Bandat ..................................... 714/16 |
| 5,911,060 | 6/1999 | Elliott .................................... 709/100 |
| 6,009,258 | 12/1999 | Elliott ..................................... 703/22 |

*Primary Examiner*—Eric W. Stamber
*Assistant Examiner*—Russell W. Frejd
*Attorney, Agent, or Firm*—Fliesler, Dubb, Meyer Lovejoy, LLP

[57] ABSTRACT

An apparatus and computer method, that are generally referred to herein as ANTI-FREEZE™, are provided for controlling the operation of a computer running under a multitasking operating system (OS) such as WINDOWS® 95 or WINDOWS® NT operating system. When an application program becomes unresponsive to inputs from the keyboard and/or mouse, ANTI-FREEZE™ provides a user interface for identifying the unresponsive program and for causing the OS to send a message to the identified program. If the identified program responds to the message, ANTI-FREEZE™ determines if the identified program has any disabled windows and if so, enables a a disabled window. If the identified program does not respond to the message, ANTI-FREEZE™ modifies the stack or another part of the identified program in a way that causes it to become responsive to messages sent from the OS.

38 Claims, 6 Drawing Sheets

AUTOMATED SEQUENCE OF MACHINE-PERFORMED ATTEMPTS TO UNFREEZE AN APPARENTLY FROZEN APPLICATION PROGRAM

CROSS-REFERENCE TO CO-OWNED PATENT APPLICATIONS

This application continues from Ser. No. 08/937,629, filed Sep. 26, 1997, now U.S. Pat. No. 5,911,060. The disclosure of said application is incorporated herein by reference.

1) Patent application originally entitled "COMPUTER METHOD AND APPARATUS REQUIRING A ZERO FOOTPRINT IN A PROCESS FOR EXPANDING ALLOCATED MEMORY TO THE PROCESS," Ser. No. 08/823,675, filed on May 29, 1997, inventors Scott Elliott and John D. Teddy, assigned to the same assignee as this patent application, is hereby incorporated by reference in this patent application as if fully set forth in this application.

2) Patent application originally entitled "COMPUTER METHOD AND APPARATUS FOR ACCESSING AN APPLICATION PROGRAM AFTER THE APPLICATION PROGRAM HAS BECOME UNRESPONSIVE OR INCURRED A FATAL ERROR", Ser. No. 08/938,204 , filed Sep. 26, 1997, inventor Scott Elliott, assigned to the same assignee as this patent application, is hereby incorporated by reference in this patent application as if fully set forth in this application.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to a computer method and apparatus for unfreezing an apparently frozen application program being executed under control of a multitasking operating system. More particularly, the invention relates to a computer method and apparatus for regaining access to an application program which has become unresponsive to user inputs such as from the keyboard and/or the mouse of the computer system executing the application program.

2. Description of the Related Art

There are instances when an application program running under the WINDOWS* 95 or WINDOWS® NT operating systems ceases to be responsive to user inputs such as from the keyboard and/or the mouse of a computer system. When this occurs, the application program is called frozen. Presently one of the few things that a user can do when this occurs is to call the "Close Program" function of the operating system by depressing the Ctrl+Alt+Del keys on the keyboard. This action will cause the operating system to display the "Close Program" dialog box. The displayed dialog box will include a list of all programs running under the operating system and will indicate whether any of the programs so listed are unresponsive.

If another of the programs is marked unresponsive, where that other program is not the apparently frozen application program of main interest on which the user experienced the problem, the user can select the unresponsive other program and then select "End Task" which will close that other program. Of course by doing such any data not previously saved from within that unresponsive other application program may be lost. The user can then close the Close Program dialog box thereby closing the Close Program function and then can ascertain whether or not the "End Task" operation performed on the other, not-responding program has caused the apparently frozen application of main interest to now become unfrozen, that is, to become responsive to user inputs such as from the keyboard and the mouse.

If the only the program marked unresponsive is the apparently frozen application program of main interest on which the user experienced the problem, the user can only select this application program and then select "End Task" which will close that program. Of course by doing so, any data not previously saved from within that apparently frozen and unresponsive program may be lost.

There are occasions where the "Close Program" dialog box will not list any programs as being unresponsive after a user has experienced an application program becoming unresponsive to user inputs such as from the keyboard and/or mouse. Under this situation, the user can still select that application program and then select "End Task" which will close that program. Of course by doing such any data not previously saved in that program will be lost.

SUMMARY OF THE INVENTION

It is an object of the present invention to provide a machine-implemented method and apparatus that can make an apparently-frozen application program responsive to user inputs such as from the keyboard and/or mouse after the application program becomes unresponsive to inputs from the keyboard and/or mouse without closing the application program running under WINDOWS® 95, WINDOWS® NT and like, multitasking operating systems (OS's).

Briefly the invention provides an apparatus and computer method for controlling the operation of a computer running under an operating system such as WINDOWS® 95 or WINDOWS® NT so as to make an unresponsive application program again responsive to user inputs such as from the keyboard and/or mouse of the computer system. A program, hereinafter referred to as Anti-Freeze™ (AF), is stored and installed in a memory of a computer for the purpose of controlling the computer to operate in the desired manner. The installation procedure will establish an Anti-Freeze™ icon for calling the Anti-Freeze™ program. Once installed Anti-Freeze™ may be further stored elsewhere than the computer memory.

Different levels of nonresponsiveness to user inputs may occur. If Anti-Freeze™ cannot be called by means of the installation-established Anti-Freeze icon, then it may be indirectly invoked by pressing the Ctrl+Alt+Del keys and bringing up the Close Program dialog box. The calling of the Close Program dialog box will cause Anti-Freeze to add an Anti-Freeze button into the Close Program dialog box. The user then selects the frozen program and clicks on the Anti-Freeze™ button. Anti-Freeze™ when called in this manner will initiate an AFHook routine for processing the selected program of the "Close Program" dialog box. AFHook will determine if the selected program is a WIN16 program and if so whether that WIN16 program is hard locked, that is, not responding to messages from the operating system. AFHook will initiate a 16-Bit AddInstSet routine for a hard locked WIN16 program. The 16-Bit AddInstSet routine will insert a substitute message-dispatch loop and will thereby provide the user with access to that WIN16 program such that the user may save the data and exit that WIN16 program. In all other cases AFHook will cause ANTI-Freeze to enter into the AFGeneral routine.

When Anti-Freeze™ (AF) is called by the icon (or by equivalent means), an AFApp routine will display an Anti-Freeze™ dialog box. The user selects the frozen application from the Anti-Freeze™ dialog box and clicks on the unfreeze button in the Anti-Freeze™ dialog box which will initiate an AFGeneral routine.

AFGeneral will determine if the selected application program is soft locked (that is responsive to messages from the operating system) or hard locked (unresponsive to messages from the operating system).

Where the selected application program is soft locked, a respective AFSoft routine is initiated. AFSoft determines if any of the windows of the selected application program are disabled and if so AFSoft enables one or more of the disabled windows such that the selected application program becomes unfrozen (that is becomes responsive to the keyboard and mouse). If all the windows for the selected program are enabled, a message is displayed informing the user that Anti-Freeze™ can do nothing more for fixing the soft locked problem.

Where the selected application program is hard locked, an AFHard routine is initiated as the "debugger" for the selected application and the selected application program is stopped. The AFHard routine first initiates a StackTrace routine, which includes a WalkStack routine and a ScanStack routine. One or the other of WalkStack and ScanStack searches for a special signature on the stack of the hard locked program. If the signature search is successful, the StackTrace routine will reset the context of the application program such that the selected application program becomes responsive (unfrozen) to user input such as from the keyboard and/or mouse. If StackTrace is unsuccessful in its search for the special stack signature, then AFHard initiates a 32-BIT AddInstSet routine. The 32-BIT AddInstSet routine causes additional memory to be allocated to the selected, 32-bit application program and installs a message loop in that additional memory. Multitasked execution is restarted at the message loop so as to provide the user with access to the selected application program such that the user may save the data and exit that application program.

An advantage of the invention is that Anti-Freeze™ regains control over an application program which is not responding to inputs from the keyboard and/or the mouse such that the user may avoid losing application data that had not been previously stored to nonvolatile memory prior to the application program becoming unresponsive to the inputs from the keyboard and/or the mouse.

BRIEF DESCRIPTION OF THE DRAWINGS

The invention will be described with respect to the particular embodiments thereof and references will be made to the drawings, in which.

DETAILED DESCRIPTION OF THE INVENTION

Figure 1:
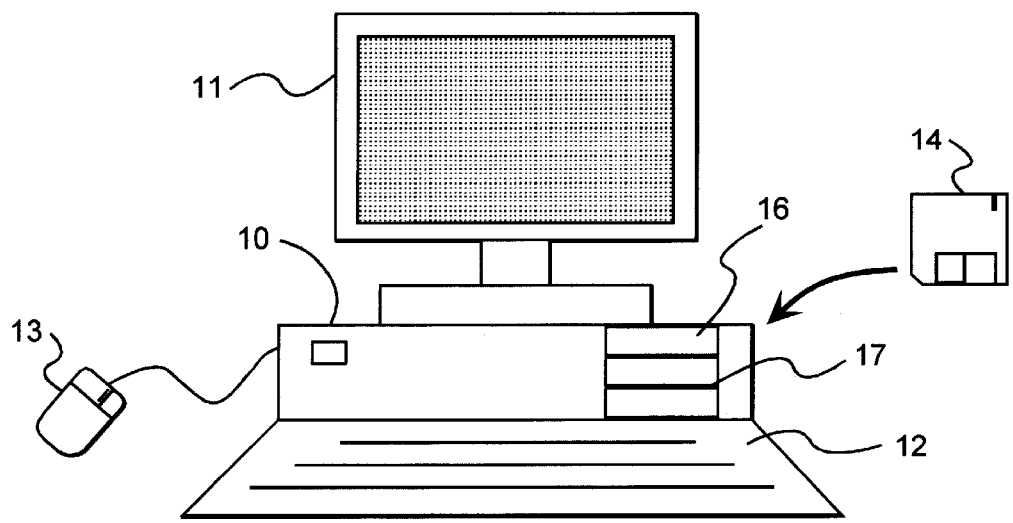
FIG. 1 illustrates a computer system embodying the present invention.
Figure 2:
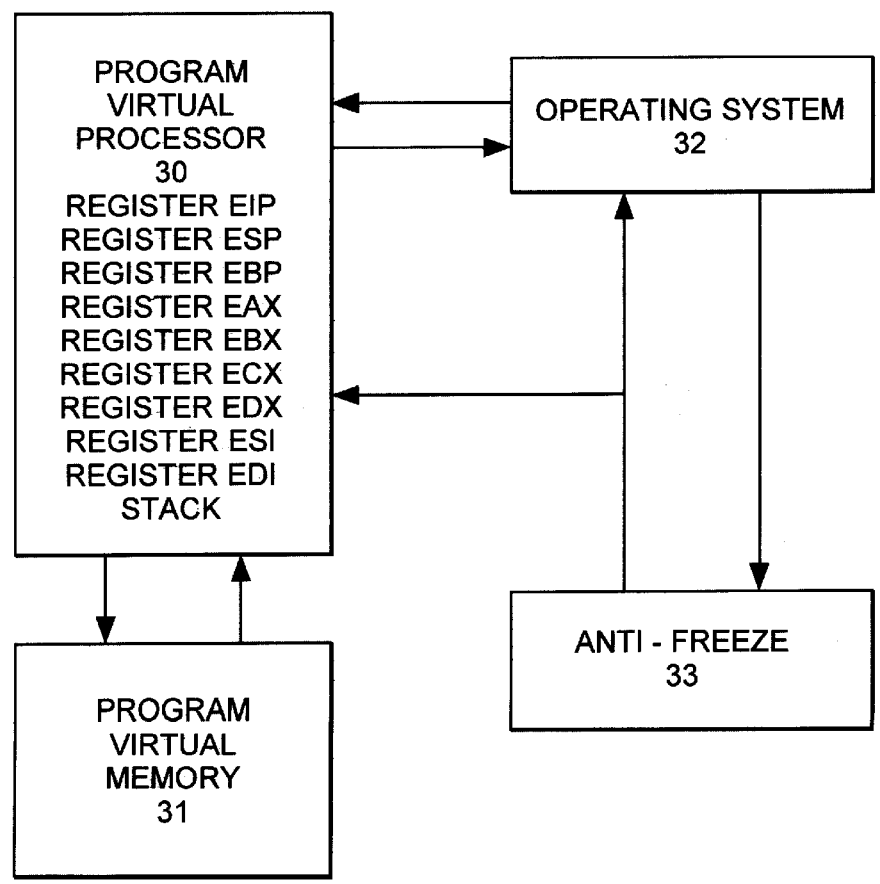
FIG. 2 is an illustration showing the interaction between the operating system, the program's virtual processor and memory and Anti-Freeze™.

Referring to FIGS. 1 and 2, a computer system is shown comprised of a mouse 13, a display 11, a keyboard 12 and a computer 10. Computer 10 includes a floppy disk drive 16, a hard disk drive 17 and a random access memory 15 (not shown in FIG. 1). The computer 10 is operating under the control of WINDOWS® 95 or WINDOWS® NT or a like multi-tasking operating system 32 (hereinafter referred to as operating system 32). The functions referred to herein are WINDOWS® 95 or WINDOWS® NT operating system functions. Under the architecture of operating system 32, a program is allocated memory space in memory 15 referred to as a virtual memory 31. Further to allow multitasking of concurrently executing programs, resources are allocated to a program which are referred to as a virtual processor 30. The virtual processor 30 includes a series of programmable registers, including but not limited to programmable registers commonly referred to as EIP, ESP, EAX, EBX, ECX, EDI, ESI and EBP. These registers are used by the operating system 32 in carrying out multitasked execution of the program. The state of these programmable registers is commonly referred to as the context of the program or the program's context. Those skilled in the art know that EIP is an abbreviation for Extended Instruction Pointer, EBP is an abbreviation for Extended Base Pointer, and ESP is an abbreviation for Extended Stack Pointer, these corresponding to nomenclature used under the Intel 80×86 CPU architecture.

An application program running under operating system 32 may become unresponsive to user inputs such as from the keyboard and/or mouse because: (1) the application program has wrongly executed a function, (2) has branched into a program flow that stops it from accepting input from the user or (3) is attempting to execute a function which it either cannot complete or cannot complete in a reasonable amount of time. When this occurs, the application program is said to be frozen and is unresponsive to keyboard strokes or mouse clicks. A frozen application program can result in the operating system being also non responsive to keyboard strokes or mouse clicks.

Disk 14 is a magnetic disk widely used in the computer industry to store programs and data. Disk 14 has recorded thereon a program, hereinafter referred to as Anti-Freeze™ 33. When disk 14 is inserted into floppy disk drive 16, computer 10 has the ability to coact with the Anti-Freeze 33 stored upon disk 14 so as to control the operation of computer 10. Computer 10 may transfer Anti-Freeze™ 33 to hard disk drive 17 or into the random access memory (RAM) 15 of computer 10 thereby allowing disk 14 to be removed from the floppy disk drive 16.

While Anti-Freeze 33 is described above as being recorded upon a floppy disk, AntiFreeze 33 may be recorded onto any recording medium (i.e. magnetic tape, magnetic cards, optical disc, optical tape, optical cards, flash memory units, semiconductor memories) that may be used as an input medium to a computer system running under the operating system 32.

The principal elements of the Anti-Freeze architecture are the following five routines:

(1) AFHook—A routine which is established as an extension to the Close Program dialog box, where the latter box appears when the user presses Ctrl+Alt+Del under operating system 32. The AFHook routine contains a 16-bit AddInstSet routine for use with Win16 programs.

(2) AFApp—A routine that provides a mechanism by way of which the user can chose which program the user thinks is frozen and submit it to an AFGeneral routine. The AFApp routine accepts input in a way similar to how input is accepted from the AFHook routine so as to allow the fixing process to skip directly to the next-described AFGeneral routine.

(3) AFGeneral—A routine that selects one of the below-described AFSoft and AFHard routines for fixing a frozen program by analyzing the frozen program to determine which fixing routine is required.

(4) AFSoft—A routine for fixing a soft-locked program. A soft-locked program is a program whose internal processing is functioning normally, but which has its user-interfaces disabled. AFSoft attempts to enable the user-interface by re-enabling disabled windows and thereby returning the program to normal.

(5) AFHard—A routine for fixing a hard-locked program. A hard-locked program is a program which does not respond to messages from the operating system 32. The AFHard routine chooses between several subroutines for fixing the hard-locked program. The subroutines stop the current, multitasked operation of the hard-locked program, change its context, and thereafter force the program to start processing its messages again from the new context.

I Calling Anti-Freeze

Figure 3:
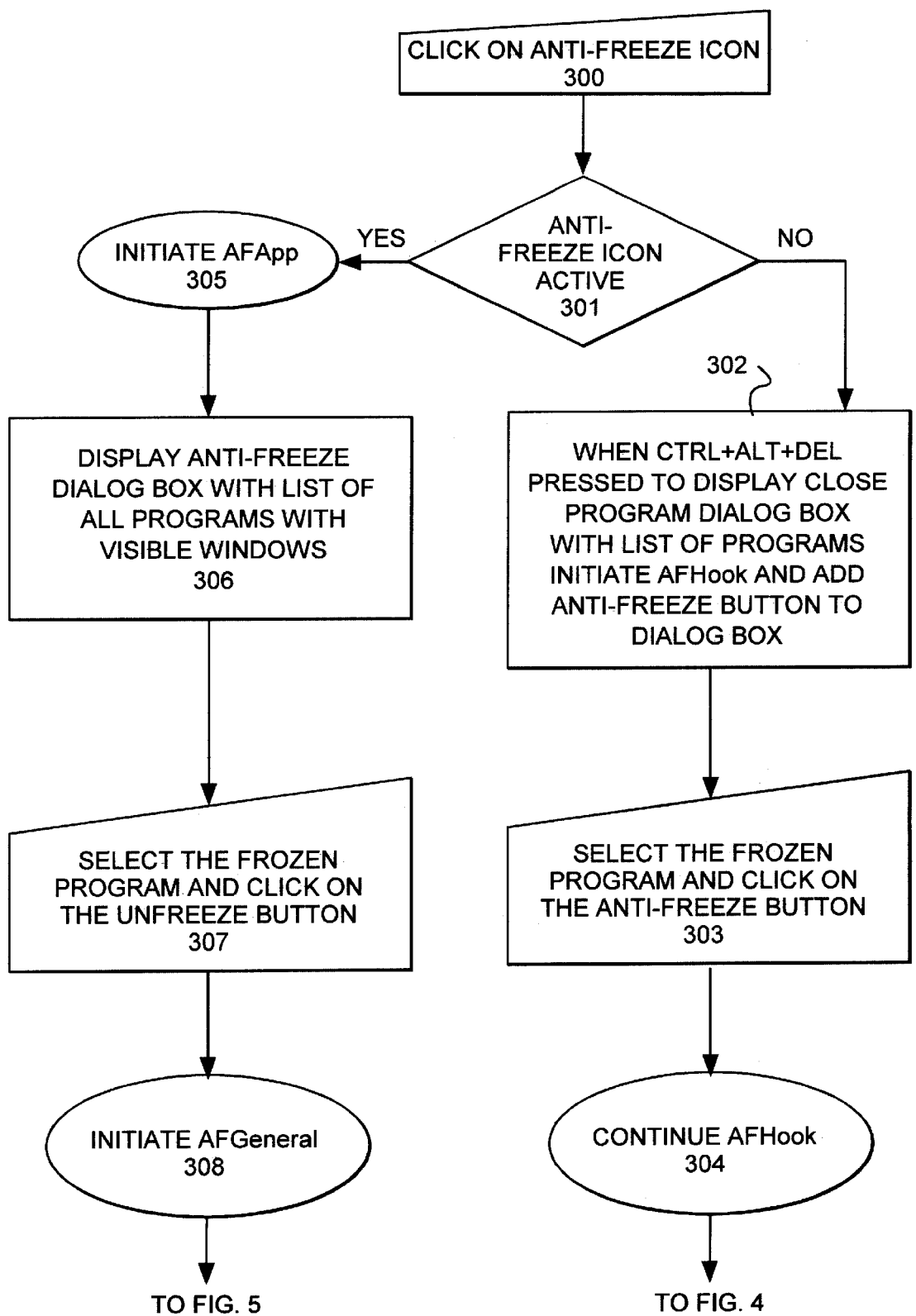
FIG. 3 is a flow chart illustrating the process for initiating Anti-Freeze™ and specifically including AFApp and part of AFHook.

Referring to FIG. 3, when a application program becomes unresponsive the user, in step 300, will first attempt to initiate Anti-Freeze 33 by clicking upon the Anti-Freeze icon (or will select Anti-Freeze 33 through the Start Menu of operating system 32) which will initiate AFApp.

If the operating system itself has become unresponsive to keyboard stokes or mouse clicks, then Anti-Freeze 33 cannot be called by step 300. The user passes through step 301 to step 302 where the user depresses the Ctrl+Alt+Del keys to display the Close Program dialog box of operating system 32. AFHook also responds to the depression of Ctrl+Alt+Del keys and adds an Anti-Freeze™ button to the Close Program dialog box. The user, in step 303, then selects the application program shown to be unresponsive in the dialog box or, if no application program is marked as unresponsive, the application program that the user was executing when the application program became unresponsive. The user, in step 303, then clicks on the Anti-Freeze™ button in the Close Program dialog box which will in step 304 continue the processing of AFHook to step 400 of FIG. 4.

II AFApp

Figure 5:
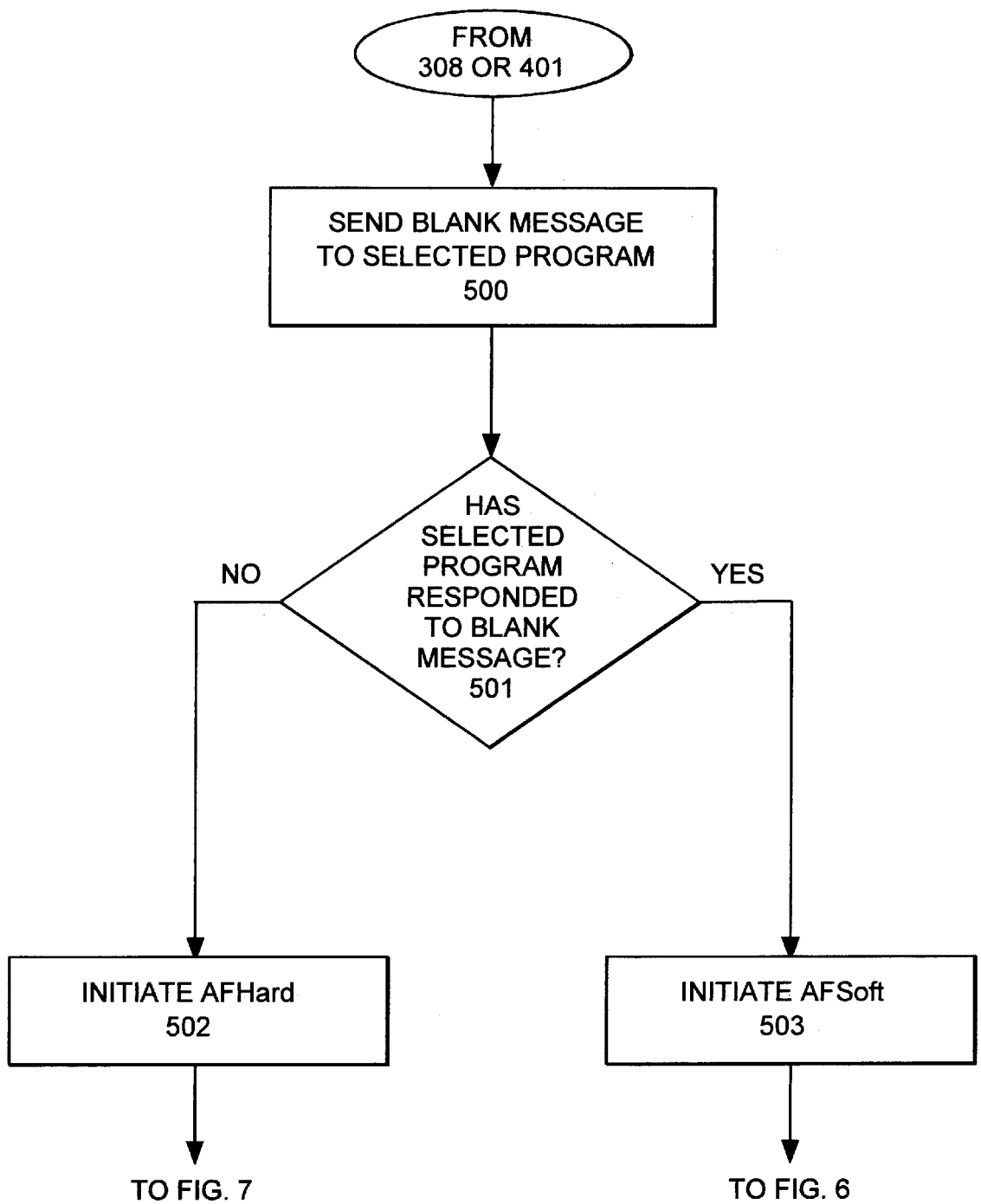
FIG. 5 is a flow chart illustrating AFGeneral.

Still referring to FIG. 3, when Anti-Freeze 33 is called in step 300, then, in step 305, the AFApp input accepting routine is initiated. AFApp, in step 306, will display an Anti-Freeze dialog box and will list all open programs running under operating system 32. The user in step 307 selects the application program that was being executed when the application program became unresponsive and clicks upon the Unfreeze button in the dialog box which will, in step 308, initiate the AFGeneral routine (FIG. 5).

Alternatively, AFApp can test each running program in step 306, for responsiveness and mark any unresponsive program. This allows the user to select the marked unresponsive program, in step 307, even if the marked unresponsive program was not the program being used by the user when the program being used by the user became unresponsive. It may be desirable for a user to so select another program. It is possible for a second program running in the background to cause a first program being run in the foreground to appear to be unresponsive. By attempting to first cure the second program which is marked as unresponsive, even though the so-marked, second program was not the foreground program, all unresponsive problems with regards to all application programs may be solved.

III AFHook

A hard-locked Win16 program can prevent the AFApp input-accepting routine from working but does not interfere with the processing of functions associated with the Close Program dialog box of operating system 32.

Figure 4:
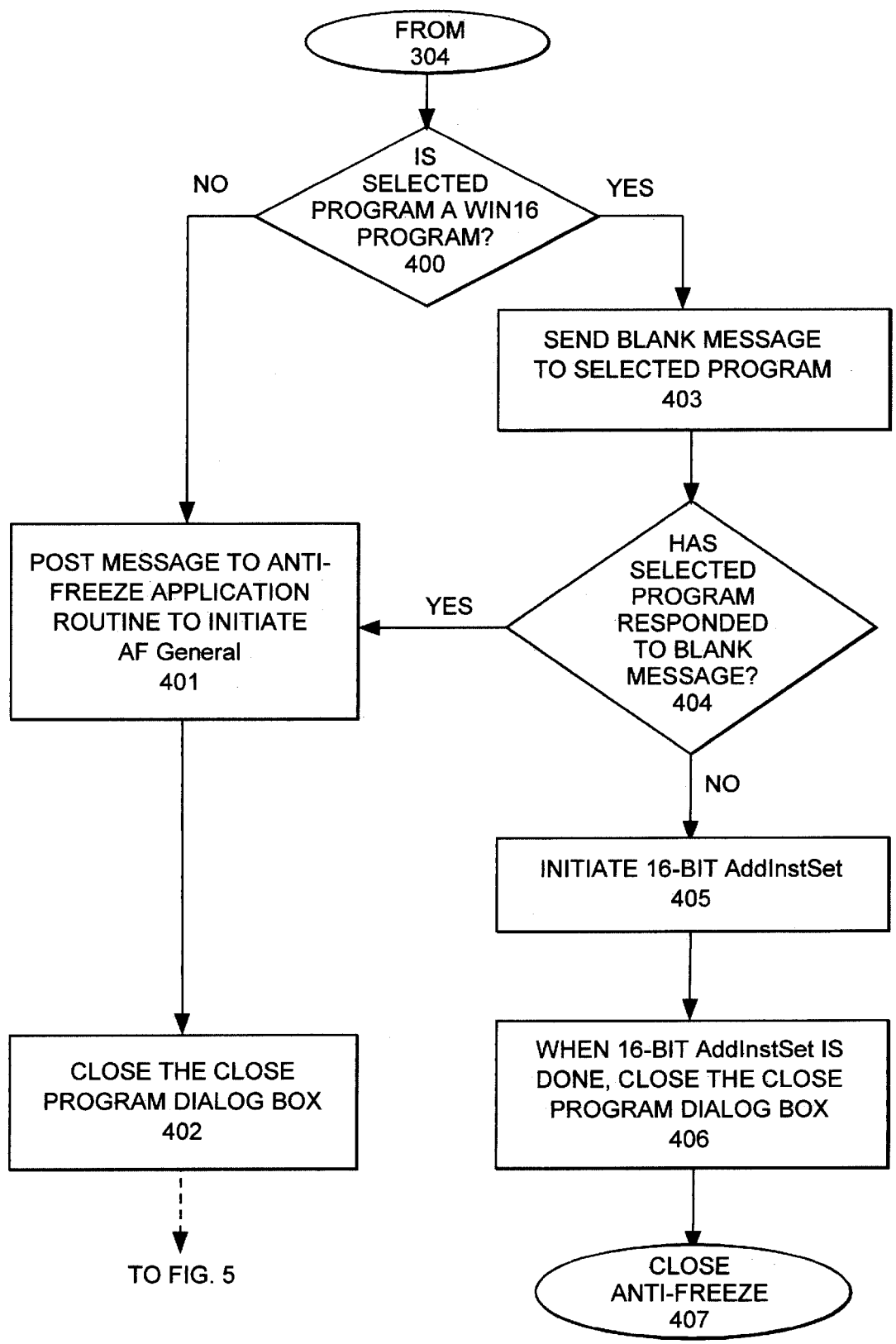
FIG. 4 is a flow chart illustrating AFHook.

Referring to FIG. 4, the AFHook routine which was initiated in step 302 is continued from step 304 of FIG. 3. The user has already selected a program from the Close Program dialog box and has clicked on the Anti-Freeze button in the Close Program dialog box.

In step 400, the selected program is first tested to determine if the selected program is a Win16 program. If the selected program is not a Win16 program, AFHook, in step 401, posts a message to AFApp to initiate AFGeneral and closes the Program Dialog box. If the selected program is a Win16 program, AFHook, in step 403, causes a blank message to be sent by operating system 32 to the selected program. AFHook then monitors the selected program to ascertain if the selected program responded to the blank message. If the selected program has responded then the selected program is deemed to be soft-locked in step 404 and AFHook branches to step 401 which posts a message to AFApp to initiate AFGeneral and closes the Close Program dialog box.

AFHook is applicable to Windows 95, where a single errant Win16 program can freeze the entire system. Under Windows NT, a non-responsive Win16 program will only interfere in the functioning of other Win16 programs, and won't disturb AFApp because the latter is a Win32 program. Hence, there is no need for AFHook under Windows NT. The description will hereinafter be directed to a Windows 95 environment and it is within the skill of the art to modify the architecture of Anti-Freeze for use in Windows NT.

While the Close Program dialog box is visible, all other programs are stopped. AFHook always closes the Close Program dialog box when AFHook is done such that other programs can resume operation.

Where the selected program does not respond, in step 404, to the blank message, it is concluded that the Win16 program is hard-locked. AFHook must then initiate, in step 405, a 16-bit AddInstSet routine immediately, since no other program will function until the problem is corrected. When the 16-bit AddInstSet routine is completed, AFHook closes the Close Program dialog box, in step 406, and closes Anti-Freeze 33 in step 407.

IV 16-Bit AddInstSet Routine

Operating system 32 delegates an area of memory space in which all Win16 programs run. When the computer starts, Anti-Freeze installs a 16 bit routine containing a message-dispatch function into the designated Win16 memory space. Anti-freeze stores the address of the message-dispatch function using the SetWindowLong function. The address of the message-dispatch loop is obtained by calling GetWindowLong.

The 16 Bit AddInstSet routine performs the following operations:

1) Establish location of a substitute message-dispatch function in the Win16 memory space for the selected program by:
   a) Call GetWindowLong to retrieve the address of the 16-bit message-dispatch function.

2) Change the context of the selected program's virtual processor 30 such that the selected program will start executing the message-dispatch function by:
   a) Read the Ring-O-Thread-Control-Block (a special handle) from the undocumented thread database structure associated with the specified 16-bit program. This entails:
      i) Get the program's thread ID by calling GetWindowProcessThreadId.
      ii) The thread ID points to an undocumented structure. The Ring-o-Thread-ControlBlock is located 92 bytes into this structure.
   b) Call VMM.VxD (the core system device driver), using the Ring-O-Thread-Control-Block. This can be accomplished by calling a service called VWIN32/GetThreadContext, which retrieves the same context structure as step 3(a) of the 32-Bit AddInstSet routine (discussed below).
   c) Change the IP and CS registers to the address of the message-dispatch function from step 2. Here two registers are changed because the address of the message-dispatch function is a 32-bit quantity, but the IP register holds only 16 bits in a 16-bit program, and the other 16 bits of the address must be recorded in the CS register. Under 32-bit programs, the EIP register can hold the entire 32-bit address.
   d) Store the modified context structure by calling a VMM service called VWIN32/SetThreadContext.
3) Start the selected program which will provide the user with an opportunity to save and exit the selected program.

V AFGeneral

At this point in time, AFGeneral has been initiated by AFApp in response to step 308 of FIG. 3 or step 401 of FIG. 4. AFGeneral is a routine that selects either AFSoft or AFHard by analyzing the selected program to determine which routine is required.

Referring to FIG. 5, AFGeneral at step 500 causes a blank message to be sent by operating system 32 to the selected program. AFGeneral then monitors the selected program, in step 501, to ascertain if the selected program responded to the blank message. If the selected program has responded then it is determined that the selected program is soft-locked and AFGeneral branches to step 503 to initiate the AFSoft routine. If the selected program has not responded then it is determined that the selected program is hard-locked and AFGeneral branches to step 502 to initiate the AFHard routine.

VI AFSoft

AFSoft is a routine for fixing soft-locked programs. A soft locked program is a program whose internal processing is functioning normally, but which has the user-interfaces disabled.

Figure 6:
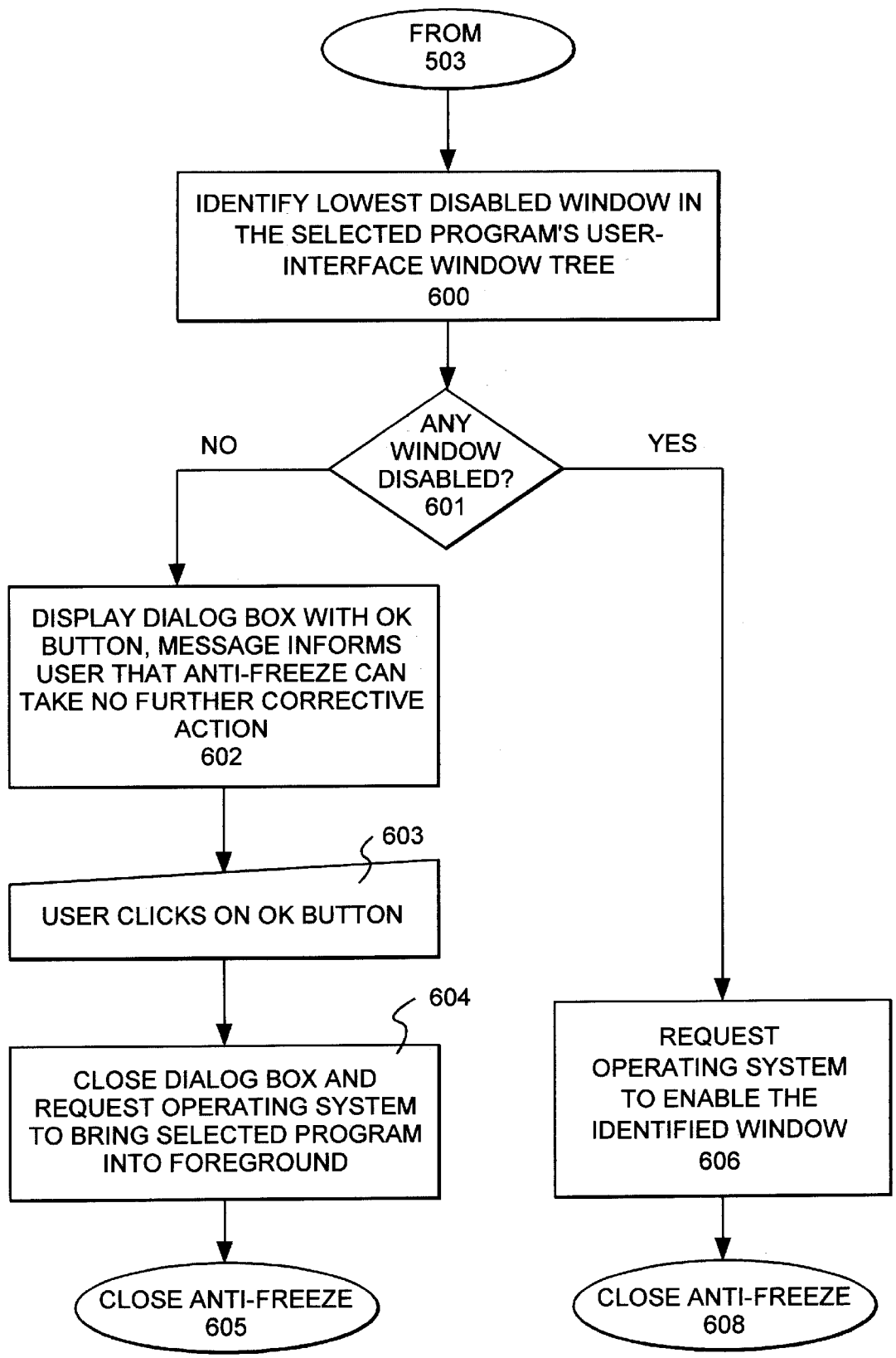
FIG. 6 is a flow chart illustrating AFSoft.

Referring to FIG. 6, AFSoft, in step 600, scans all the selected program's user-interface windows to see if any user-interface windows are disabled. AFSoft calls the Enumwindows function of operating system 32 with directions for it to call a disabled-identifying subroutine of AFSoft. This disabled-identifying subroutine is called for each user-interface window. The disabled-identifying subroutine interrogates that window to ascertain if the window is disabled. This is done by use of the IsWindowEnabled function. For the first window found to be disabled, AFSoft stores the identity of that window. For each succeeding window that is found to be disabled, the disabled-identifying subroutine determines if that subsequent disabled window is lower on the window tree for the selected program then the identity of the disabled window previously stored by AFSoft and if so stores that subsequent window's identity in place of the previously stored disabled window identity. When the subroutine has been run for all windows found in response to the EnumWindow function, AFSoft will have stored the identity of the disabled window that was lowest on the window tree for the selected program. Alternatively, AFSoft can have a subroutine that makes a list of the identity of all disabled windows.

If AFSoft has found a disabled window, then in step 601 AFSoft branches to step 606. In step 606, AFSoft sends a request to operating system 32 to enable the window whose identity AFSoft's subroutine has stored. Where alternatively, AFSoft made a list of all disabled windows, then in step 606, AFSoft sends a request to the operating system 32 to enable all of the disabled windows in the list.

Alternatively, AFSoft's subroutine in step 600 could request operating system 32 to enable each window found to be disabled when first found which would remove the need for step 606.

AFSoft then closes Anti-Freeze in step 608.

If no disable window was found in step 600, then AFSoft would branch in step 601 to step 602. AFSoft in step 602 displays a dialog box which informs the user that Anti-Freeze can take no further corrective action. The dialog box has an OK button which upon being clicked upon by the user in step 603 signals AFSoft, in step 604, to close the dialog box and request operating system 32 to bring the selected program into the foreground. AFSoft then closes Anti-Freeze in step 605.

VII AFHard

AFHard is a routine for fixing a hard-locked program. A hard-locked program is a program which does not respond to messages from the operating system 32. This AFHard routine chooses between several subroutines each of which changes the context of the current multitasked execution of the hard-locked program and thereby forces the program to start processing messages again. The subroutines are a 32-Bit AddInstSet routine and a StackTrace routine.

Figure 7:
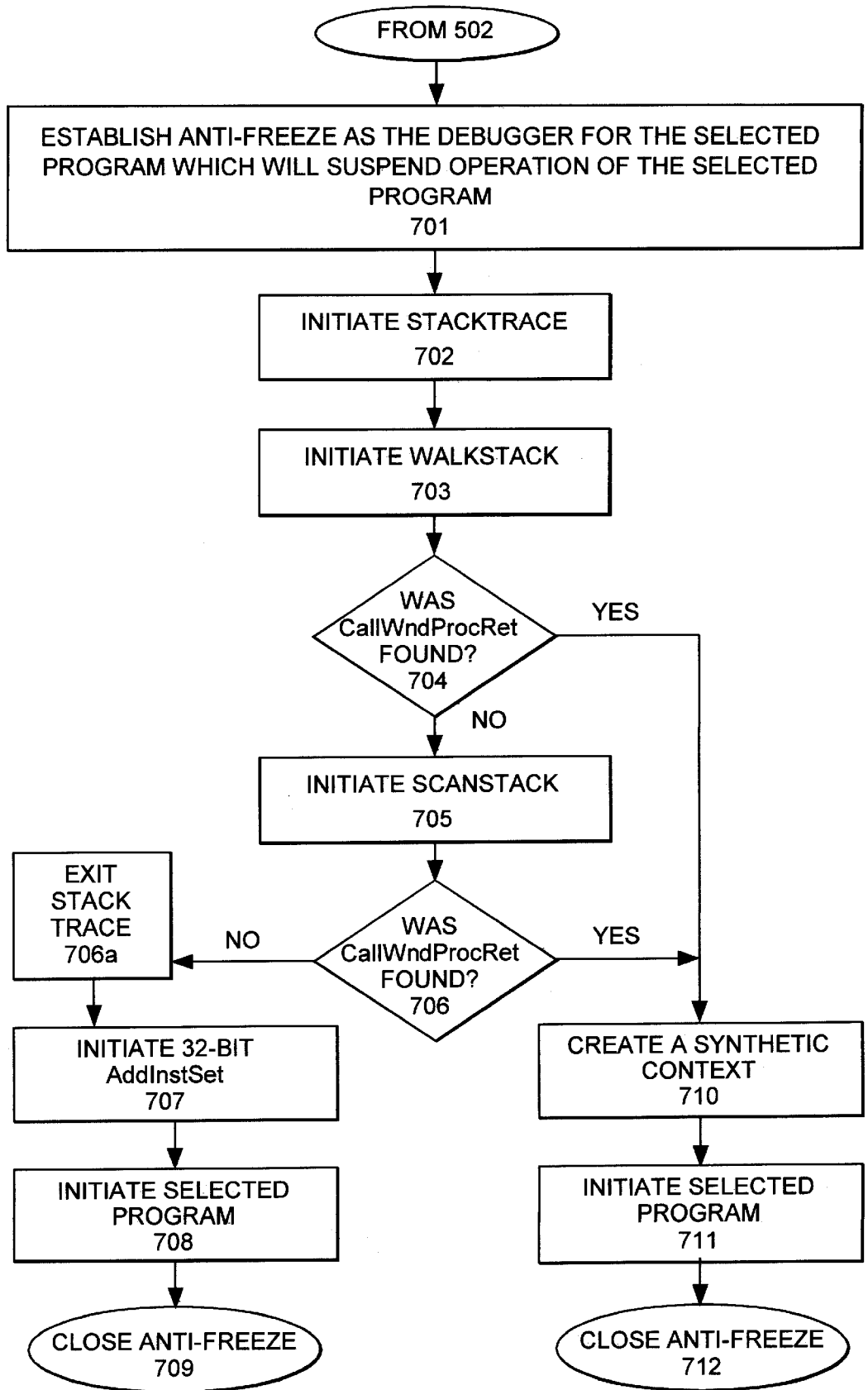
FIG. 7 is a flow chart illustrating AFHard.

Referring to FIG. 7, AFHard, in step 701 first establishes AFHard as the debugger for the selected program by calling DebugActiveProcess to take control of the selected program. The selected program is automatically suspended when the debugger thread begins running. AFHard, in step 702, initiates the StackTrace routine. The StackTrace routine then ascertains parameters for a so-called CallWndProc function of the OS 32. StackTrace next initiates in step 703, a stack tracing operation referred to herein as WalkStack (described in detail below). The WalkStack operation is used to find the location in the stack of the frozen program, of a stack cell that contains a special signature, namely, a return address for the CallWndProc function. If the search conducted by WalkStack is determined to be unsuccessful in step 704, then StackTrace initiates a second stack searching operation referred to herein as ScanStack (described in detail below) in step 705. ScanStack uses a different searching algorithm from that of WalkStack to try to find the location in the stack of the frozen program, of a stack cell that contains the special signature, namely, the return address for the CallWndProc function. If, in step 706, it is determined that the search conducted by ScanStack was unsuccessful, then StackTrace is exited and AFSoft initiates in step 707 a so-called, 32-Bit AddInstSet routine (described in detail below).

If the search conducted by either ScanStack or WalkStack was successful then StackTrace creates a synthetic context (described in detail below) in step 710 for the selected program. The synthetic context of step 710 is such that when the currently stopped, multitasked execution of the selected program (frozen program) is restarted, that re-started execution will continue under a pretense that the function that was being processed when the selected program became unresponsive successfully completed instead of becoming stuck somewhere in the course of its execution. The multitasked execution of the selected program is restarted in step 711 and Anti-freeze is closed in step 712.

The StackTrace operation which successfully completes in steps 710–712 does not insert new instructions into the virtual memory 32 of the frozen program. By contrast, the 32-bit AddInstSet routine, which is initiated in step 707, adds memory to the virtual memory space for the selected program. The 32-bit AddInstSet routine then establishes a message dispatch loop within the newly-added memory space of the selected program. The 32-bit AddInstSet routine then causes the multitasked execution of the selected program to be reinitiated so as to execute the new message dispatch loop. This new message dispatch loop should allow the user to save the data of the selected program and then exit the selected program. Step 708 represents the restart of the multitasked execution of the selected program in the state where, upon the re-strat of the selected program, the selected program begins to immediately process the message dispatch loop in step 708. Antifreeze is closed in step 709.

VIII 32-Bit AddInstSet Routine

The 32 Bit AddInstSet routine executes the following operations:

1) If not yet in debugger mode, call DebugActiveProcess to take control of the selected program which will automatically suspend the selected program when the debugger thread begins running.
2) Establish message-dispatch loop in the selected program's virtual processor and virtual memory by:
   a) Allocate memory in the virtual memory by:
      i) Replace first 11-bytes of selected program with an 11-byte function to allocate memory.
      ii) Briefly restart the selected program, just long enough for it to run the 11-byte function and thereby ask the OS to allocate additional memory space to the virtual memory of the selected program.
      iii) Record the address of the new memory and restore the original contents of the selected program's first 11 bytes.
      iv) An example of an 11-byte function is provided in the above-referenced, application Ser. No. 08/823,675 as a Routine__A having the following code:

| | |
|---|---|
| push ecx | ;Record the number of bytes ;needed |
| push 0x40 | ;Record the type of memory as ;global |
| call eax | ;Call Globelalloc{} to allocate ;memory |
| mov ebx, 0x4B4F2D41 | ;put arbitrary value in ebx to ;verify | int 3

Additionally, a zero-footprint method which does not overwrite data in the virtual memory of the selected program is also disclosed in the the above-referenced, application Ser. No. 08/823,675.

b) Copy a message-dispatch loop function into newly allocated, virtual memory space for the selected program. One message-dispatch loop function that will restore a degree of control over the selected program so as to allow the user to save the program and exit is as follows:

Get Message User selects function by keyboard or mouse such as SAVE or SAVE AS
Translate Message Translates key pressed into character message
Dispatch Message System performs requested function
Exit Process End routine 3) Change the context of the virtual processor 30 of the selected program to start executing in the message-dispatch loop by:
   a) Read the values of the selected program's registers into a context structure using GetThreadContext.
   b) Change the EIP register's value to the first address of the newly allocated virtual memory.
   c) Store the context structure back into the selected program's registers using SetThreadContext.
4) Explicitly resume the program by calling ContinueDebugEvent.

IX Stack Trace Routine

A} Background: How the Stack operates during a function call

StackTrace (702) relies on certain attributes of stack structuring and conventional post-call procedures which are detailed here. This is an example of how a piece of a program's virtual stack might look when the program decides to place a call to a function which we will call TargetFunc. Arbitrarily assume that the to-be-called, TargetFunc function is a Window-procedure. Such a Window-procedure is a type of function that StackTrace investigates when it traces through the stack of a target program, as will be seen below. For purposes of present understanding, a Window-procedure may be thought of as a sort of "gateway" function, through which all messages that are directed to a particular window will pass. This type of function receives four input parameters: (1) a handle identifying the window to which the message is being sent, (2) an identifier which explains what the message is (for example, the window may be asked to draw itself on the screen), and (3–4) two general purpose parameters which can contain more details about the message (such as describing what region to draw).

Reference is now made to a first depicted state (STATE__0) of an exemplary, virtual stack.

| STACK STATE 0 |
|---|
| 48 . . . |
| 47 |
| 46 |
| 45 |
| 44 |
| 43 |
| 42 |
| 41 . . . (SP/ESP points here) |

Assume that a calling program is about to place a call and that program's stack pointer, which pointer is referred to as ESP and is stored in the ESP register, is pointing to cell #41 when the program starts to place the function call. A double-border in the first depicted state (STATE__0) and in later depicted states indicates where ESP is pointing. The actual contents of cell #41 are irrelevant at this point for it is merely the last item which was piled onto the virtual stack of the executing process.

The called subroutine, TargetFunc is a Window-procedure, and as such it requires the four input parameters described above. Before calling TargetFunc, the calling program must push those four parameters onto the stack. To do so, the calling program uses the PUSH instruction to automatically increment ESP to a new stack location and to then store a PUSHed value in that new cell.

The following four depictions of stack states 1–4 show the four parameters being entered into the stack, starting with the l and w parameters as shown:

| STACK STATE 1 |           |
|---------------|-----------|
| 48            |           |
| 47            |           |
| 46            |           |
| 45            |           |
| 44            |           |
| 43            |           |
| 42            | Parameter 4 (1Param) |
| 41 ...        |           |

Next:

| STACK STATE 2 |           |
|---------------|-----------|
| 48            |           |
| 47            |           |
| 46            |           |
| 45            |           |
| 44            |           |
| 43            | Parameter 3 (wParam) |
| 42            | Parameter 4 (1Param) |
| 41 ...        |           |

Next:

| STACK STATE 3 |           |
|---------------|-----------|
| 48            |           |
| 47            |           |
| 46            |           |
| 45            |           |
| 44            | Parameter 2 (Message ID) |
| 43            | Parameter 3 (wParam) |
| 42            | Parameter 4 (1Param) |
| 41 ...        |           |

Then:

| STACK STATE 4 |           |
|---------------|-----------|
| 48            |           |
| 47            |           |
| 46            |           |
| 45            | Parameter 1 (Window Handle) |
| 44            | Parameter 2 (Message ID) |
| 43            | Parameter 3 (wParam) |
| 42            | Parameter 4 (1Param) |
| 41 ...        |           |

Now that all the input parameters have been recorded onto the stack, the calling program places a call to the TargetFunc function. The act of calling the TargetFunc function automatically PUSHes a return address onto the stack. The so-PUSHed return address points back to the calling program, telling where the function was called from.

Immediately after the CALL is executed, the stack would have the depicted next state (STATE_5) with ESP pointing at cell #46.

| STACK STATE 5 |           |
|---------------|-----------|
| 48            |           |
| 47            |           |
| 46            | Function's Return Address |
| 45            | Parameter 1 (Window Handle) |
| 44            | Parameter 2 (Message ID) |
| 43            | Parameter 3 (wParam) |
| 42            | Parameter 4 (1Param) |
| 41 ...        |           |

It is standard practice in C/C++ and Pascal programs for each called function to declare a stack frame immediately after the CALL to it is made. Assuming that our exemplary TargetFunc follows this convention, as part of this convention the TargetFunc immediately PUSHes the old EBP value stored in register EBP onto the stack. As will become apparent, the old EBP (base pointer) points by convention to an older location of the stack that served as a stack base location for another, older function that was using the stack. Thus a down-pointing, linked list may be formed in the stack by a chain of such EBP-storing cells.

Immediately after the EBP PUSH is executed, the stack has the depicted next state (STATE_6) with ESP pointing at cell #47.

| STACK STATE 6 |           |
|---------------|-----------|
| 48            |           |
| 47            | Stored BP/EBP |
| 46            | Function's Return Address |
| 45            | Parameter 1 (Window Handle) |
| 44            | Parameter 2 (Message ID) |
| 43            | Parameter 3 (wParam) |
| 42            | Parameter 4 (1Param) |
| 41 ...        |           |

Since the contents of the EBP register has been stored on the stack, the called program (TargetFunc) can now store a new value in EBP register and later retrieve the old value from stack cell #47 and rewrite the old value into the EBP register. At this stage, standard programming practice calls for the program (TargetFunc) to copy the ESP value that is currently stored in the ESP register (where the current ESP value is the cell address of the stack cell #47 in which the old EBP value has just been stored) into the EBP register and to then increment the ESP value that is stored in the ESP register by adding a whole number to it. This adding of the whole number causes the stack pointer (ESP) to skip as many entries in the stack as the function wants for its own temporary use. If TargetFunc requires ten entries for its local storage, for example, it will add 10 to ESP so the latter register points at cell #57 (not shown). This reserves cells #48 through #57 as being free for the function's personal use. Since the EBP register will now point to a location in between the program's temporary storage area (cells #48–#57) and the input parameters (cells #42–#46) passed to TargetFunc from the calling routine, the system can access these cells by relatively referencing them relative to the current, base address stored in the EBP register. For example, the function's first temporary-storage variable would be stored in cell #(EBP+1) and its first input parameter would be in cell #(EBP−2). Therefore, the function does not have to be compiled with any knowledge of the actual locations where such data is stored on the stack. Rather the function accesses all short-term data by adding to, or subtracting from the stack base address stored in the EBP register.

Because the ESP value in the ESP register now points to cell #57 any additional data pushed onto the stack will start with the next cell after the one indicated by ESP: cell #58. This reserves cells #48 through #57 for the function's use and these reserved cells are referred to as the function's "stack frame". Any further subroutine function that may be CALLed by this function (TargetFunc) is responsible for preserving the values of EBP and ESP for the calling function.

When TargetFunc is done, it is responsible for restoring ESP and EBP registers to the caller's original values. To accomplish this, it copies the EBP register back into ESP register so that ESP again points at cell #47, thereby releasing the function's stack frame. Then it "POPs" the contents of cell #47 back into the EBP register, thereby decrementing the value in the ESP register to point at cell #46.

Immediately after the EBP POP is executed, the stack has the depicted next state (STATE_7).

STACK STATE 7

```
48
47
46  Function's Return Address
45  Parameter 1 (Window Handle)
44  Parameter 2 (Message ID)
43  Parameter 3 (wParam)
42  Parameter 4 (1Param)
41  ...
```

The EBP register has now been restored to its original value. Since ESP now points to cell #46 which contains the return address, TargetFunc can execute a RET (return) instruction to thereby POP the return address off the stack and allow the system to resume executing at that address. That would, however, leave the four parameter values on the stack. To remove these, the TargetFunc function uses a special variant of the RET instruction which instructs the microprocessor to also pop additional items off the stack before actually performing the return operation. TargetFunc knows it was designed to receive four parameters, so it executes a RET 4 instruction to pop 4 items off the stack in addition to the return address. This causes the microprocessor to first pop cell #46 off the stack, then four additional items, cells #45 through #42, thereby finishing with the ESP value in the ESP register pointing to cell #41 as it started out before TargetFunc was CALLed.

Immediately after the RET 4 instruction is executed, the stack has the depicted next state (STATE_8).

STACK STATE 8

```
48 ...
47
46
45
44
43
42
41 ... (SP/ESP points here)
```

This description applies to functions written using the Pascal calling convention, where a function is responsible for cleaning its parameters off the stack even though the calling program put them there. Other calling conventions exist. Those are not relevant to this discussion because Window-procedures must be written using Pascal conventions. StackTrace only deals with calls to Window-procedures, so StackTrace can ignore any other function calls recorded on the stack.

For simplicity, the term "cell" has been used to describe stack entries as atomic units. In actual practice, each "cell" can be 2 or 4 bytes in size. A 32-bit program uses 4-byte cells and a 16-bit program uses 2-byte cells. If a 16-bit program needs to store 32-bit values, which would require 4 bytes, it merely stores it into 2 adjacent cells. Although this does not materially change the behavior described here, it does alter the numbering scheme, for example, to reserve 10 "cells" on the stack, the TargetFunc function would actually have to increment ESP by 40 bytes if it was written as a 32-bit program.

B} What StackTrace does

If StackTrace can identify which stack cell is the one to be used when the CALLed program eventually returns from its Window-procedure, the context of the virtual processor 30 could synthetically be re-created. In the above example, that to-be-used return address is recorded in cell #46.

In designing Windows®95, MicroSoft dictated that a Window-procedure type of function could only be called by having the CALLing program use an OS-provided, standard-for-type, calling function, CallWndProc. Even if a program wanted to directly call its own Window-procedure, it must ask CallwndProc to place the call. Because there is only one piece of code that that is always used to call every Window-procedure, every Window-procedure that is called will consistently return to a same address when it finishes. In other words, cell #46 must cause a return to the CallWndProc function because TargetFunc is a Window-procedure that was invoked by way of the system's CallWndProc function.

If StackTrace can discover what the value is of such a return address, even if the latter is used by only one particular Window-procedure call, then StackTrace will thereby know the value of such return address for every Window-procedure call of the given system because all Window-procedure calls of a given system reference the system's CallWndProc function.

To determine the value of this address, the first action taken by StackTrace after it itself has been invoked is to itself invoke a Window-procedure. The first action taken by this invoked Window-procedure, upon being called, is to immediately look at its own stack and ascertain the return address for the CallWndProc function that invoked StackTrace's first Window-procedure. StackTrace then records the value as CallWndProcRet. StackTrace also determines a value corresponding to the size of CallWndProc's stack frame and records that value as CallWndProcSize for later use.

The arithmetic used in these algorithms may be a bit confusing because, under Intel-type microprocessors, the bottom of the program's stack is stored at a higher address than the top. Consequently, a program's stack starts at a high memory address and decrements by four for each storage cell (each cell occupies four bytes). Despite the backward numbering scheme, decreasing addresses are still referred to as "up" and the lowest address is still "the top" of the stack.

When StackTrace first begins executing, StackTrace immediately creates a window. If the target program is a 32_bit program, the Window-procedure associated with this window immediately executes the following statements to record information about the system in which StackTrace is executing:

```
{
    DWORD       dwCallWndProcRet;
    DWORD       dwStackFrameSize;
    // get the return address
    _asm
    {
        mov     eax, [ebp+4]            ; Get return address
                                        ; from stack
        mov     dwCallWndProcRet,eax    ; Store it
        mov     eax, [ebp]              ; Get the prior
                                        ; value of EBP
        lea     ebx, [ebp+4]            ; Get location of
                                        ; return address
        sub     eax, ebx                ; Calculate the
                                        ; difference
        mov     dwStackFrameSize,eax    ; Store it as the
                                        ; stack frame size
    }
    // store it
    g_JitData.dwWndProcRet = dwCallWndProcRet;
    g_JitData.dwStackFrameSize = dwStackFrameSize;
}
```

This excerpt, written partly in assembler, looks back on the stack to find out where it was called from and saves this value in the dwCallWndProcRet variable. As discussed earlier, all 32-bit Window-procedures in the system get called the same way, so they will all return to the same address. The code then calculates the distance between the stack cell which stores dwCallwndProcRet and the stack cell which contains the EBP value for a next-lower stack frame. This calculated distance is later used to determine how far a below-described WalkStack routine will have to look back up the stack during a below-described "overshoot and look back up" procedure. The above assembly excerpt concludes by copying the results into a global data structure called g_JitData.

When called, StackTrace obtains the value of the special signature, namely, CallWndProcRet and searches for that value on the selected program's stack. The preferred way to do this is to walk the selected program's stack in an orderly fashion by the WalkStack routine and if that fails then to scan the stack by the ScanStack routine.

C) WalkStack Routine

In walking down through the selected program's stack, WalkStack works backwards from the selected target program's current state to find the most recent location where a Window-procedure of the target program was called. It does this by working backward, jumping from one to the next of the program's stack frames. Although standard practice in debugging tools, such walking upon stack frames or frame-tracing is considered an extremely advanced skill. In standard practice, however, the information collected from frame-tracing is only useful if the target program was compiled to share special knowledge of its internal structure with the debugger. If frame-tracing is applied to an arbitrary program that is merely taken out-of-the-box, the frame-trace can reveal where a program's stack frames are located, but nothing certain about their contents.

Referring to for example, the above STACK STATE 6 and the standard steps taken thereafter, it can be seen that after the value of the ESP register for a CALLed program is stored in the EBP register of the virtual processor for that program, the value of the program's EBP register points generally to the end of its current stack frame (that is, to cell #47 which is just below the bottom-most cell #48 of the stack frame). Also (as in the example), the value stored in the stack from the EBP register (e.g., the value in cell #47) also points to the cell which records the previous stack frame's EBP value, that is the stack frame used by the calling function and to which EBP would be restored when returning to the caller. That EBP value, in turn, will point to the cell which records the previous value of EBP, and so on in a continuous chain. Thus, a downward-directed, linked list is defined. As long as the chain is unbroken, WalkStack can walk backward in precise, frame-tracing steps through all the outstanding stack frames by using this chain of EBP values.

One straight-forward way in which WalkStack could identify the cell containing the special signature that it is looking for, namely, the return address for the CallWndProc function is to look in the cell (e.g., #46) immediately adjacent to the cell (e.g., #47) that stores the walked-on EBP value to see if the address of CallWndProcRet is stored there. In the example of STACK STATE 6, the old value of the EBP register is stored in cell #47, and the return address to the CALLing routine is stored in the immediately adjacent cell #46. This is extremely common, since most functions declare a stack frame immediately after being called, thereby recording EBP in the next cell after the one holding their caller's return address. This immediate nexus of the EBP-holding cell (e.g., #47) and the Return-holding cell (e.g., #46) is not guaranteed, however, since the programmer or compiler might have decided to store other items on the stack before declaring a stack frame (which declaring includes PUSHing EBP onto the stack and reserving additional stack area for storage of local variables). Nevertheless, this straight-forward technique would be adequate in most situations.

However, the preferred embodiment of WalkStack uses an indirect technique instead of the straight-forward technique for determining the location of the cell that may store the the address of CallWndProcRet. WalkStack avoids making the simple-minded assumption that the Return-holding cell is immediately below the EBP-holding cell. Instead of looking at the cell immediately below the current, EBP-holding cell, WalkStack jumps beyond, to the next-lower EBP-holding cell. In other words, WalkStack deliberately overshoots the EBP-holding cell of the stack frame it is currently investigating and instead points to the EBP-holding cell of the next lower (previous) stack frame. After deliberately overshooting the address of the current frame's EBP-holding cell and instead pointing to the next lower EBP, WalkStack looks upward by a known distance to see if it thereby overshot a Return-holding cell. Because StackTrace initially recorded a value representing the size of CallWndProc's stack frame as CallWndProcSize, it knows the length of every CallWnd-Proc stack frame. WalkStack can point up by that amount and further up by the known length of the input parameters area to see if it can find a cell storing the special signature value, namely, CallWndProcRet.

Consider the stack shown below as STACK STATE_A wherein the EBP of cell #47 points to cell #38 and the latter stores an EBP of an earlier frame:

| STACK STATE A |
|---|
| 48 . . . |
| 47 Previous EBP (points to cell #38) |
| 46 "CallWndProcRet" return address |
| 45 Parameter 1 (Window Handle) |
| 44 Parameter 2 (Message ID) |
| 43 Parameter 3 (wParam) |
| 42 Parameter 4 (1Param) |
| 41 Stack Frame Cell #3 |
| 40 Stack Frame Cell #2 |

-continued

STACK STATE A

39  Stack Frame Cell #1
38  Previous EBP

As already explained, in order to locate the cell of STACK STATE A that holds the CallWndProcRet address by way of the straight-forward technique, WalkStack could have walked the chain of EBP values and checked the immediately adjacent cells for the CallWndProcRet value, which it would find in cell #46 when it had traced down to cell #47. If the special return address was not stored in the cell (e.g., #46) immediately adjacent to the cell (e.g., #47) that stores the walked-on EBP value, this straight-forward method would not work. To solve this problem, WalkStack overshoots the current EBP-holding cell (#47), points to the next lower EBP-holding cell (#38), and then looks back up the stack for the CallWndProcRet value associated with the next lower EBP-holding cell (#38). In this example, it would have to walk a little further using the EBP value of cell #47 which points to cell #38.

In doing this test, StackTrace remembers that its next current location will be cell #38. If the test fails, StackTrace will continue its search from that cell #38, not from the cell #47 whose frame contents it was just examining as part of the signature-finding test. To perform the test, StackTrace counts up the stack from cell #38, skipping the three cells (#39, #40, #41) it previously determined would be in the CallWndProc's stack frame, plus the four cells (#42, #43, #44, #45) containing the input parameters that the CallWndProc would have pushed onto the stack for the called function in the called function's stack, thereby getting to and examining cell #46 without relying in this example on there being an immediate nexus between the higher EBP-holding cell (e.g., #47) and the Return-holding cell (e.g., #46).

If the stack frame being so-examined belongs to the function called by CallWndProc, the cell being examined will contain the special value of CallWinProcRet, as its does in cell #46 in this example.

Here is the reason why. If cells #39–#41 are truly the stack frame of the standard CallWndProc function, then cell #38 would hold the EBP value that CallWndProc pushed when it declared its stack frame (#38–#41). Cells #42–#45 would then be the ones consumed by the standard CallWndProc function as it pushed the 4 input parameters onto the stack in preparation for calling the target, Window-procedure. Cell #46 would then be the one consumed by the standard CallWndProc function as it CALLed the target, Window-procedure and as a result, the return address back to the next instruction inside the standard CallWndProc function was automatically pushed onto the stack. Cell #47 may or may not then hold the EBP value that the target, Window-procedure pushed when it declared its stack frame (e.g., #48–#57). Generally it does if the target, Window-procedure follows the standard practice in C/C++ and Pascal programs.

If the stack frame under investigation is not that of the process which occurs when a Window-procedure function is called by CallWndProc, then StackTrace will not find the value of CallWinProcRet in that particular cell #46. WalkStack will then continue to walk through the stack from cell #38 searching for the value of CallWinProcRet in each subsequent stack frame that is tested.

When StackTrace initially located and recorded the value of CallWndProcRet for its later use, it also measured the distance from CallWndProcRet's position to the location of the EBP-holding cell of the previous or next lower stack frame and named this value CallWndProcSize. WalkStack therefore needs only to subtract the CallWndProcSize from the EBP value stored in the stack to ascertain the higher-up on the stack address of the cell storing the CallWndProcRet value regardless of the location of CallWndProcRet with reference to the location of EBP in the stack frame.

The WalkStack routine uses a function called JITDEBUG_Find_Call WndProcRet which contains the following C-language statements:

```
DWORD WINAPI JITDEBUG_Find_CallWndProcRet
(
    const HANDLE      hProcess,
    const DWORD       dwCurrentEBP,
    const DWORD       dwBottomOfStack
)
{
    DWORD             dwResult = 0;
    DWORD             dwStackItem;
    DWORD             dwNewEBP = 0;
    // Start from current value of EBP
    dwStackItem = dwCurrentEBP;
    // Keep searching until we find a result, or we run
    //     out of stack
    while (!dwResult && dwStackItem > dwNewEBO &&
        dwStackItem < dwBottomOfStack)
    {
    // Current stack item contents become EBP
    dwNewEBP = dwStackItem;
    // Look to see if we've passed the CallWndProc return
    //     address
    if (!ReadProcessMemory g_JitData.hProcess,
        (LPCVOID) (dwNewEBP - g_JitData.dwStackFrameSize)
        (LPVOID) &dwStackItem, sizeof(dwStackItem; NULL
        ))
        return (0);
    // Is it a match?
    if (dwStackItem == g_JitData.dwCallWndProcRet)
    {
        // We've apparently located the return address to
            CallWndProc
        dwResult = dwNewEBP - g_JitData.dwStackFrameSize;
    }
    else
    {
        // Read the EBP value of the next stack frame
        if (!ReadProcessMemory ( g_JitData.hProcess,
            (LPCVOID) dwNewEBP, (LPVOID) &dwStackItem,
            sizeof(dwStackItem); NULL ))
            return (0);
    }
    };
    return (dwResult);
}
```

As seen from the above C-langauage code, the WalkStack routine requires the following input parameters: (1) the selected program's process handle, (2) the value of the selected program's EBP register at the time the selected program became unresponsive, and (3) the location of the bottom of the selected program's stack to prevent WalkStack from running off the bottom of the selected program's stack if WalkStack cannot find CallWndProcRet.

WalkStack function starts at the stack cell identified by the EBP register of the frozen, target program. WalkStack then immediately looks upward (toward the "top") on the stack to see if it has overshot the CallWndProcRet value, which of course it has not yet because it has not gone anywhere yet. Since it has not found CallWndProcRet, the function then reads the contents out of the stack cell indicated by the EBP register, which identifies another stack frame farther down the stack (toward the "bottom"). It repeats its check for CallWndProcRet and continues advancing down the stack until it either locates an appropriately-positioned cell containing CallWndProcRet or runs out of the stack. WalkStack also quits if, for some reason, any of the links leads toward the top of the stack which is an illegal condition for the downwardly pointing chain of EBP values.

When the WalkStack succeeds, WalkStack returns a value identifying which stack cell contains CallWndProcRet.

D} Scanstack Routine

If WalkStack could not locate CallWndProcRet because, for example, the chain of stack frames was broken, StackTrace next employs a ScanStack routine to search for CallWndProcRet. ScanStack searches sequentially through the stack for the return value, working upwardly from the bottom of the stack. Because ScanStack searches upwardly from the beginning of the stack, ScanStack will find the first occurrence of the CallWndProcRet value, rather than the most recent. Frequently there is only one occurrence, so this yields the same result as "WalkStack" would have if the chain of EBP's had not been broken.

However, a window-procedure may have done something which caused it to be called again before it was finished (a re-entrant call), so there may be two or more outstanding occurrences of CallWndProcRet. Although StackTrace would prefer to use the most recent occurrence, only the earliest occurrence can be certified as authentic by the ScanStack method. If the more recent occurrence is not authentic, the program will suffer irreparable damage if StackTrace uses it. A non-authentic or decoy occurrence may remain in the stack because the computer does not erase the stack memory when it is done using it. Each decoy started as an authentic return address, but it was left in the stack memory after its window-procedure function returned.

An example of a re-entrantly called window-procedure is one for servicing user clicking on a pushbutton. Such a window-procedure would get called re-entrantly, for example, when the user clicks on a displayed pushbutton with the mouse. The system calls the window-procedure with a message telling it the user has clicked the mouse, so the window-procedure changes the appearance of the pushbutton to look depressed. That change could cause the window-procedure to implicitly call itself (via CallWndProc as usual) with a message asking it to redraw in the depressed state.

ScanStack works in the other direction from that of WalkStack, starting from the bottom of the stack and working toward the top until it finds CallWndProcRet.

ScanStack executes the following statements:

```
(
    const HANDLE      hProcess,
    const DWORD       dwCurrentESP,
    const DWORD       dwBottomOfStack
)
{
    DWORD             dwResult = 0;
    DWORD             adwBlock[64];
    UINT              iBlock;
    // ignore first entry in first "block"
    iBlock = 0;
    while (!dwResult && dwBottom > dwCurrentSp)
    {
        //move to previous entry (if any)
        if (iBlock)
            iBlock--;
        else
        {
            // no previous entry, so load a set of 64
            // entries
```

```
            dwBottom -= sizeof(adwBlock);
            if (!ReadProcessMemory(g_JitData.hProcess,
            (LPCVOID)dwBottom, (LPVOID)adwBlock,
            sizeof(adwBlock), NULL ))
                return (0);
            // start at last entry in current block
            iBlock = 63;
        }
        // is the dispatch-function's return address
        // in there?
        if (adwBlock[iBlock] == g_JitData.dwCallWndProcRet)
            dwResult = dwBottom + (4 * iBlock);
    }
    return (dwResult);
}
```

ScanStack reads 64 stack cells at a time into a temporary buffer and searches through it so Windows' ReadProcessMemoxy function is not called repeatedly to retrieve every single cell. ScanStack effectively starts at the bottom of the selected program's stack and searches each cell until it either finds CallWndProcRet or runs into the top of the stack, which is identified by the address in the selected program's ESP register.

D Creating a synthetic context for a program to resume

Upon successfully discovering where CallWndProcRet resides on the program's stack, StackTrace adjusts the selected program's context (registers) to simulate the environment into which the selected target program would have eventually continued had the selected program not became unresponsive.

To do so, StackTrace must set the registers of the selected program so that the next instruction to be executed will be a RETURN using the value of CallWndProcRet.

CallWndProc expects the window-procedure to return a result value in the EAX register, but since CallWinProc does not examine the result code but merely records it, it is not critical what value StackTrace places there.

The ESP register is extremely critical because it controls the program's use of its stack. Therefore, StackTrace must set the ESP register so that the CallWndProc function can properly return to whomever called it. As discussed before, when a Window-procedure function is returned, the ESP register for the selected program points to CallWndProcRet and is decremented as the system pops the CallWndProcRet cell and the four cells following it off the stack. Since StackTrace has determined the address of the cell which contains CallWndProcRet, StackTrace calculates the value for the ESP register by subtracting five cells from the cell address that contains CallWndProcRet.

The value of the EBP register, likewise, is critical because it controls Call[]ndProc's access to its own storage, as well as pointing to the value of the previous stack frame. StackTrace derives the value for the EBP register by adding the value of CallWinProcSize to the value calculated for the ESP register above.

CallWndProc expected the EDI register to be preserved. In the 32-bit version of CallWndProc function the EDI register contains a copy of value in the ESP register. StackTrace copies the value calculated for the ESP register above into the EDI register. The 16-bit version of CallWndProc does not use the EDI register, therefore StackTrace need not address the EDI register for Win16 programs.

The value in the ESI register is not used after a return to CallWndProc, therefore StackTrace does not have to put any special value in the ESI register.

To obtain the foregoing, StackTrace performs the following statements:

```
Return_To_CallWndProc
(
    const HANDLE       hThread,
    const DWORD        dwStackCellOfCallWndProcRet
)
{
    CONTEXT            cntx;
    //Get current program registers
    GetThreadContext( hThread, &cntx );
    // Adjust the execution context
    cntx.Esp = dwStackCellOfCallWndProcRet;
    cntx.Ebp = dwStackCellOfCallWndProcRet +
        g_JitData.dwStackFrameSize;
    cntx.Edi = cntx.Esp + 4;
    // Simulate the action a RET 10 would cause
    cntx.Eip = g_JitData.dwCallWndProcRet;
    cntx.Esp += 4 + 16;
    // Resume the program at the new context
    SetThreadContext( hThread, &cntx );
}
```

To execute the above Return_To_CallWndProc function, StackTrace passes to this function a handle to the selected program's thread, so StackTrace can examine and modify the selected program's registers, and the location of the stack cell which contains CallWndProcRet. The function retrieves the selected program's current register settings and sets them to the values they would have contained immediately after the program's called Window-procedure had returned normally. The EIP (instruction pointer) register identifies the next instruction to execute, which will be at the location pointed to by CallWndProcRet, where the latter value is retrieved from g_JitData.dwCallWndProcRet of the above code. The stack pointers point to the stack frame used by CallWndProc.

The stack pointers point to the stack frame used by CallWndProc. When the function finishes, StackTrace can restart the selected program. The selected program will resume from within the CallWndProc function exactly as it would have if the program's Window-procedure had finished what it was doing and returned normally.

At this point, StackTrace will close the Anti-Freeze process.

While the above description teaches a preferred sequence of execution of the different routines comprising Anti-Freeze, various other sequences of execution of the different routines will also obtain the desired results. Further specific implementation for each routine has been set forth and given this, it is well within the skill of the artisan in the art to generate other routines that perform the same function to obtain the same results. For example, once one has ascertained the return address and size of the CallWinProc function those values could be thereafter permanently stored in Anti-Freeze and recalled when needed rather than obtaining those value each time StackTrace is initiated. In doing this however the StackTrace may not work properly if the CallWinProc function is altered in later versions of the operating system.

Further for the Windows NT operating system the 16 Bit AddInstSet is folded into the AFHard routine which can be modified to determine if the selected program is a Win16 program and if so to direct the processing to the Win16 routines for AFSoft, StackTrace and the 16-bit AddInstSet.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A machine-implemented method for reestablishing user access to an apparently frozen and identified one of plural programs running under a multitasking operating system, where said plural programs include multitasked programs;

where for each respective multitasked program running under said OS (operating system), the OS provides a respective virtual processor that includes a virtual stack and a plurality of respective context registers for supporting multitasking said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, where said OS further provides a standard-for-type calling function for use by each given one of the multitasked programs when that given multitasked program is about to invoke a callable, target function of a corresponding type, and where said standard calling function consistently within said OS, places a special signature value on the virtual stack of a given program for use in returning from a respectively invoked target function of the corresponding type after the given program uses the standard-for-type calling function to invoke the respective target function;

said machine-implemented, reestablishing method comprising the steps of:

(a) determining whether the identified program is soft-locked or hard-locked, where a soft-locked program is one that responds to messages sent to it from the OS, and a hard-locked program is one that does not respond to messages sent to it from the OS;

(b) in response to said determining step (a) determining that the identified program is soft-locked, searching for a disabled window associated with the identified program and, if such a window is found, enabling the found window;

(c) in response to said determining step (a) determining that the identified program is hard-locked, performing at least one of the substeps of:

(c.1) searching for said special signature value on the virtual stack of the identified program; and (c.2) installing an external message dispatch loop for the identified program; and (d) in further response to said determining step (a) determining that the identified program is hard-locked, and after one of said substeps (c.1) and (c.2) is performed, modifying at least one of the context registers of the identified program and initiating multitasked execution of the identified program with the modified, at least one context register.

2. The machine-implemented reestablishing method of claim 1 wherein said step of searching for a disabled window includes:

(b.1) searching for a first disabled window in a window tree of the identified program;

(b.2) if the first disabled window is found, searching further down the window tree of the identified program for a second disabled window that is lower on the window tree than the first disabled window; and said step of enabling a found window includes:

(b.3) enabling the found, disabled window that is lowest on the window tree of the identified program.

3. The machine-implemented reestablishing method of claim 1 wherein said step of enabling a found window includes:

(b.1) enabling all of the disabled windows that are found to be on the window tree of the identified program.

4. The machine-implemented reestablishing method of claim 1 wherein said step (c.2) of installing an external message dispatch loop for the identified program includes:

(c.2a) determining whether the identified program is a 16-bit program; and (c.2b) if said determining step indicates that the identified program is a 16-bit program, changing at least two context registers of the selected program's virtual processor such that the selected program will start executing a predefined, 16-bit message-dispatch function.

5. The machine-implemented reestablishing method of claim 4 wherein said step (c.2a) of determining whether the identified program is a 16-bit program is performed before said step (a) of determining whether the identified program is soft-locked or hard-locked.

6. The machine-implemented reestablishing method of claim 1 wherein said step (c.1) of searching for said special signature value includes a substep of:

(c.1a) performing a stack walk wherein said special signature value is searched for in a top-to-bottom, linked chain of stack frames.

7. The machine-implemented reestablishing method of claim 6 wherein said step (c.1) of searching for said special signature value further includes a substep of:

(c.1b) if said special signature value is not found by said performing of the stack walk, performing a stack scan wherein said special signature value is searched for in a bottom-to-top stepping through cells of the stack of the identified program.

8. The machine-implemented reestablishing method of claim 7 wherein if said step (c.1) of searching for said special signature value is unsuccessful, said step (c.2) of installing the external message dispatch loop is carried out.

9. The machine-implemented reestablishing method of claim 1 wherein if said step (c.1) of searching for said special signature value is unsuccessful, said step (c.2) of installing the external message dispatch loop is carried out.

10. The machine-implemented reestablishing method of claim 1 wherein:

said OS manipulates windows, including passing messages to said windows; and said standard-for-type calling function is a Window-procedure calling function for calling a corresponding Window-procedure type of target function.

11. The machine-implemented reestablishing method of claim 10 wherein said special signature value is a return address for returning to the standard-for-type calling function.

12. A computing machine having a multitasking operating system (OS) and an ability to unfreeze an identified one of multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, where said standard-for-type invoking function consistently within said OS, places a special signature on the virtual stack of the given program that uses said standard-for-type invoking function to respectively invoke a given target function of the corresponding type; and said OS manipulates windows within window trees, including passing messages to selected ones of said windows;

said computing machine comprising:

(a) determining means for determining whether the identified program is soft-locked or hard-locked, where a soft-locked program is one that responds to messages sent to it from the OS, and a hard-locked program is one that does not respond to messages sent to it from the OS;

(b) first unfreezing means, responsive to said determining means such that when said determining means determines the identified program is soft-locked, the first unfreezing means searches for a disabled window associated with the identified program and, if such a window is found, enables the found window;

(c) second unfreezing means, responsive to said determining means such that when said determining means determines the identified program is hard-locked, the second unfreezing means performs at least one of the substeps of:

(c.1) searching for said special signature value on the virtual stack of the identified program; and (c.2) installing an external message dispatch loop for the identified program; and wherein after one of said substeps (c.1) and (c.2) is performed by the second unfreezing means, said second unfreezing means further modifies at least one of the context registers of the identified program and initiates multitasked execution of the identified program with the modified, at least one context register.

13. The unfreezable computing machine of claim 12 wherein said first unfreezing means includes:

(b.1) window finding means for searching for a first disabled window in a window tree of the identified program, and if the first disabled window is found, searching further down the window tree of the identified program for a second disabled window that is lower on the window tree than the first disabled window; and (b.2) window enabling means for enabling the found, disabled window that is lowest on the window tree of the identified program.

14. The unfreezable computing machine of claim 12 wherein said first unfreezing means includes:

(b.1) window finding means for searching for all disabled windows in a window tree of the identified program; and (b.2) window enabling means for enabling at least one of the found, disabled windows on the window tree of the identified program.

15. The unfreezable computing machine of claim 12 and further comprising:

(d) priority unfreezing means for determining before general unfreezing activities occur whether the identified program is a 16-bit program, and if so, whether the identified 16-bit program is soft-locked or hard-locked.

16. The unfreezable computing machine of claim 15 wherein said priority unfreezing means further includes context modifying means which operate, if said determining indicates that the identified program is a 16-bit program, to modify at least two context registers of the selected program's virtual processor such that the selected program will start executing a predefined, 16-bit message-dispatch function.

17. The unfreezable computing machine of claim 12 wherein said second unfreezing means includes:

(c.1a) stack walking means for performing a stack walk wherein the presence of said special signature value is searched for in a top-to-bottom, linked chain of stack frames.

18. The unfreezable computing machine of claim 17 wherein operations of said stack walk further include a determination of whether the special signature value is located in a predefined cell position among cells of each of the searched stack frames.

19. The unfreezable computing machine of claim 17 wherein said second unfreezing means includes:

(c.1b) stack scanning means for performing, if said special signature value is not found by way of said stack walk, a stack scan wherein said special signature value is searched for in a bottom-to-top stepping through cells of the stack of the identified program.

20. The unfreezable computing machine of claim 19 wherein if said second unfreezing means does not find the special signature value, the second unfreezing means further performs the (c.2) substep of installing the external message dispatch loop.

21. The unfreezable computing machine of claim 12 wherein if said second unfreezing means does not find the special signature value, the second unfreezing means further performs the (c.2) substep of installing the external message dispatch loop.

22. The unfreezable computing machine of claim 12 wherein:

said standard-for-type calling function is a Window-procedure calling function for calling a corresponding Window-procedure type of target function.

23. The unfreezable computing machine of claim 22 wherein: said special signature value is a return address for returning to the standard-for-type calling function.

24. A manufactured, instructing signal for instructing a predefined computing machine to perform an unfreezing operation on an identified program, where the computing machine has a multitasking operating system (OS) and the identified program is one of plural multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, where said standard-for-type invoking function consistently within said OS, places a special signature on the virtual stack of the given program that uses said standard-for-type invoking function to respectively invoke a given target function of the corresponding type; and said OS manipulates windows within window trees, including passing messages to selected ones of said windows;

said instructing signal instructing the computing machine to perform a set of operations comprising:

(a) determining whether the identified program is soft-locked or hard-locked, where a soft-locked program is one that responds to messages sent to it from the OS, and a hard-locked program is one that does not respond to messages sent to it from the OS;

(b) in response to said determining step (a) determining that the identified program is soft-locked, searching for a disabled window associated with the identified program and, if such a window is found, enabling the found window;

(c) in response to said determining step (a) determining that the identified program is hard-locked, performing at least one of the substeps of:

(c.1) searching for said special signature value on the virtual stack of the identified program; and (c.2) installing an external message dispatch loop for the identified program; and (d) in further response to said determining step (a) determining that the identified program is hard-locked, and after one of said substeps (c.1) and (c.2) is performed, modifying at least one of the context registers of the identified program and initiating multitasked execution of the identified program with the modified, at least one context register.

25. The manufactured, instructing signal of claim 24 wherein said computing machine is instructed to perform said substep (c.1) of searching for said special signature value, the instructing signal further instructing the computing machine to perform before said substep (c.1) of searching for said special signature value, the additional operation of:

(c.0) identifying the special signature that is consistently placed on the virtual stack of each given program by the standard-for-type invoking function as the invoking function executes within said machine.

26. The manufactured, instructing signal of claim 25 wherein:

said standard-for-type invoking function calls the target function in order to invoke the target function; and said special signature is a return address value which is placed on the virtual stack of the identified program as the invoking function calls the target function.

27. The manufactured, instructing signal of claim 26 wherein:

said standard-for-type invoking function is a Window-procedure calling function for calling a corresponding Window-procedure type of target function.

28. The manufactured, instructing signal of claim 24 wherein:

said context registers of each multitasked program include at least one more register for keeping track of a state the multitasked program is next to be in when its execution resumes during multitasking; and (d.1) said modifying operation modifies the at least one more register of the context registers of the identified program to a state that the at least one more register would next be in if the respectively invoked target function of the identified program completes successfully.

29. The manufactured, instructing signal of claim 28 wherein the at least one more register is a a base pointer which is used for keeping track of what location in its virtual stack the multitasked program is next to use as a relative addressing base when its execution resumes during multitasking.

30. The manufactured, instructing signal of claim 29 wherein:

the standard-for-type invoking function and each invoked target function of said corresponding type reserves space for itself on the virtual stack of the multitasked program that invokes the target function by declaring a stack frame;

said step of declaring a stack frame includes pushing onto the stack an old value of the base pointer before modifying said base pointer; and (c.1a) said searching operation includes walking down the stack of the identified program in steps constituted by stack frames, where the walking down process uses a chain of stack cells storing said pushed-onto-the-stack old values of the base pointer as guides for said process of walking down the stack.

31. The manufactured, instructing signal of claim 30 wherein:

said standard-for-type invoking function consistently declares for itself a stack frame of a predefined size;

said standard-for-type invoking function consistently pushes a predefined number of parameters onto the stack after declaring for itself said stack frame of the predefined size and just before the special signature is placed on the stack, thereby causing there to be a consistent offset, in terms of same number of cells, between the base of the stack frame declared by the standard-for-type invoking function and the place on the stack where the special signature is stored; and (c.1b) said instructed searching operation uses the consistent offset to identify within each of the walked-through stack frames, the cell which should, if at all contain an authentic version of said special signature.

32. The manufactured, instructing signal of claim 30 wherein:

(c.1c) if said instructed searching operation fails to locate the special signature by walking down the stack, the instructed searching operation further attempts to locate the special signature by scanning up cell by cell from the bottom of the virtual stack of the identified program searching for the first occurrence of a cell containing said special signature.

33. The manufactured, instructing signal of claim 32 wherein:

said identified program is one which has been identified as not responding to messages sent from the OS and is therefore a frozen program.

34. The manufactured, instructing signal of claim 33 which instructs the computing machine to perform a further operation of:

(d) causing multitasked execution of the frozen program to stop before the searching for the special signature begins if the identified, frozen program is not yet stopped.

35. A computer-readable medium for instructing a predefined computing machine to perform an unfreezing operation on an identified program, where the computing machine has a multitasking operating system (OS) and the identified program is one of plural multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, where said standard-for-type invoking function consistently within said OS, places a special signature on the virtual stack of the given program that uses said standard-for-type invoking function to respectively invoke a given target function of the corresponding type; and said OS manipulates windows, including passing messages to selected ones of said windows;

said computer-readable medium instructing the computing machine to perform a set of operations comprising:

(a) determining whether the identified program is soft-locked or hard-locked, where a soft-locked program is one that responds to messages sent to it from the OS, and a hard-locked program is one that does not respond to messages sent to it from the OS;

(b) in response to said determining step (a) determining that the identified program is soft-locked, searching for a disabled window associated with the identified program and, if such a window is found, enabling the found window;

(c) in response to said determining step (a) determining that the identified program is hard-locked, performing at least one of the substeps of:

(c.1) searching for said special signature value on the virtual stack of the identified program; and (c.2) installing an external message dispatch loop for the identified program; and (d) in further response to said determining step (a) determining that the identified program is hard-locked, and after one of said substeps (c.1) and (c.2) is performed, modifying at least one of the context registers of the identified program and initiating multitasked execution of the identified program with the modified, at least one context register.

36. The computer-readable medium of claim 35 wherein:

said standard-for-type invoking function calls the target function in order to invoke the target function; and said special signature is a return address value which is placed on the virtual stack of the identified program as the invoking function calls the target function.

37. The computer-readable medium of claim 36 wherein:

said standard-for-type invoking function is a Window-procedure calling function for calling a corresponding Window-procedure type of target function.

38. A machine-implemented method for automatically sequencing through a hierarchy of attempts to unfreeze an identified and apparently frozen application program;

wherein the apparently frozen application program executes in a computing machine having a multitasking operating system (OS);

wherein the identified program is one of plural multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, wherein said standard-for-type invoking function consistently within said OS, places a special signature on the virtual stack of the given program that uses said standard-for-type invoking function to respectively invoke a given target function of the corresponding type; and wherein said OS manipulates windows, including passing messages to selected ones of said windows;

said machine-implemented method for automatically sequencing through the hierarchy of attempts comprising the steps of:

(a) determining whether the identified program is soft-locked or hard-locked, where a soft-locked program is one that responds to messages sent to it from the OS, and a hard-locked program is one that does not respond to messages sent to it from the OS;

(b) in response to said determining step (a) determining that the identified program is soft-locked, searching for a disabled window associated with the identified program and, if at least one such a window is found, enabling the found window;

(c) in response to said determining step (a) determining that the identified program is hard-locked, searching for said special signature on the virtual stack of the identified program; and (d) if said step (c) of searching for the special signature is unsuccessful, establishing an external message dispatch loop for the identified program.

* * * * *